US011790295B1

(12) United States Patent
Theobald et al.

(10) Patent No.: US 11,790,295 B1
(45) Date of Patent: Oct. 17, 2023

(54) SYSTEM AND METHOD OF MOVING CARTS USING A ROBOT

(71) Applicant: Vecna Robotics, Inc., Waltham, MA (US)

(72) Inventors: Daniel Theobald, Somerville, MA (US); Siddharth Ram Chhatpar, Winchester, MA (US)

(73) Assignee: VECNA ROBOTICS, INC., Waltham, MA (US)

( * ) Notice: Subject to any disclaimer, the term of this patent is extended or adjusted under 35 U.S.C. 154(b) by 467 days.

(21) Appl. No.: 16/891,806

(22) Filed: Jun. 3, 2020

(51) Int. Cl.
| | |
|---|---|
| *B65G 1/137* | (2006.01) |
| *G06Q 10/0631* | (2023.01) |
| *B66F 9/06* | (2006.01) |
| *B66F 9/12* | (2006.01) |
| *B66F 9/18* | (2006.01) |
| *G06Q 10/0639* | (2023.01) |
| *G06Q 50/28* | (2012.01) |
| *G05B 15/02* | (2006.01) |
| *B62B 5/00* | (2006.01) |
| *B66F 9/075* | (2006.01) |

(52) U.S. Cl.
CPC ..... *G06Q 10/06315* (2013.01); *B62B 5/0079* (2013.01); *B65G 1/1378* (2013.01); *B66F 9/063* (2013.01); *B66F 9/0755* (2013.01); *B66F 9/12* (2013.01); *B66F 9/18* (2013.01); *G05B 15/02* (2013.01); *G06Q 10/06393* (2013.01); *G06Q 10/06398* (2013.01); *G06Q 50/28* (2013.01); *B65G 2209/04* (2013.01)

(58) Field of Classification Search
None
See application file for complete search history.

(56) References Cited

U.S. PATENT DOCUMENTS

| | | | |
|---|---|---|---|
| 9,352,745 B1* | 5/2016 | Theobald | G05D 1/0088 |
| 9,550,624 B2* | 1/2017 | Khodl | B65G 1/1378 |
| 10,343,881 B2* | 7/2019 | Guo | B65G 1/10 |
| 10,647,559 B2* | 5/2020 | Schwarz | B66F 9/12 |
| 10,908,601 B2* | 2/2021 | Diehr | B66F 9/063 |
| 10,954,067 B1* | 3/2021 | Theobald | B25J 19/022 |
| 11,104,516 B2* | 8/2021 | Li | B65G 1/0492 |
| 11,325,782 B2* | 5/2022 | Avraham | B25J 13/02 |
| 2013/0173351 A1* | 7/2013 | Livne | G06Q 10/0639 |
| | | | 705/7.38 |
| 2017/0233199 A1* | 8/2017 | King | B65G 59/06 |
| | | | 414/789.7 |
| 2019/0119049 A1* | 4/2019 | King | B65G 57/303 |
| 2019/0176323 A1* | 6/2019 | Coady | B60L 3/12 |
| 2021/0179352 A1* | 6/2021 | Haid | B65G 1/0492 |
| 2023/0052440 A1* | 2/2023 | Hansen | B66F 9/063 |

\* cited by examiner

*Primary Examiner* — Mark C Hageman

(57) ABSTRACT

A method includes receiving, at a robot being in communication with a control center communication module of a control center, an instruction to relocate a cart to a location where a set of items are stored. The method further includes moving, by the robot, to a second location where the cart is positioned; (2) activating, by the robot, a motor of a latch fastening system to cause movement of a latch arm resulting in a latch being exposed; (3) removably engaging, by the robot and using the latch, the cart via a latching feature of the cart; (4) moving, by the robot, the cart from the second location to the location where the set of items are stored; and (5) transitioning, by the robot, a subset of the set of items to the cart in accordance with the instruction.

9 Claims, 10 Drawing Sheets

SYSTEM AND METHOD OF MOVING CARTS USING A ROBOT

FIELD OF INVENTION

The present technology pertains to robotics and more specifically to a system and method of providing and controlling robots in a warehouse environment to allow the robots to engage, via a latch fastening system, carts within the warehouse environment for the robotic retrieval and delivery of items.

BACKGROUND

The present disclosure relates to robotic systems for use in a warehouse or other environment. In many warehouse environments or supply chain environments, items have to be moved from one bin or container to another. The movement of items can be achieved through manual processes involving humans and/or the use of robots. A basic aspect of moving items involves picking as many objects from a source bin for distribution to multiple destination bins. Where humans are involved, much time is wasted when humans must locate and verify the right bins for transferring objects from bin to bin. Once the proper set of bins is identified, the human user wants to perform as many "picks" from the same source bin as possible.

Robotic warehouse systems have been developed to help manage this process in a way that is as automated as possible. Automated warehouses have some benefits over warehouses that use humans in some aspects of the process. However, a challenge that exists with respect to automated robotic systems is that they are designed for complete automation. In a completely automated robotic distribution system, typically the maximum amount of throughput is essentially fixed. Upscaling this throughput can be difficult, as the configuration of these automated robotic systems can often be fixed. This can make it difficult to reconfigure these automated robotic systems in order to move bins, carts, and other items within these warehouses. Further, there are instances where humans can perform the functions of the automated robotic systems more quickly. Thus, assigning certain operations to these automated robotic systems can result in increased inefficiencies within a warehouse environment.

Accordingly, even with increased automation in warehouse environments, additional efficiencies and scalability issues still exist.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
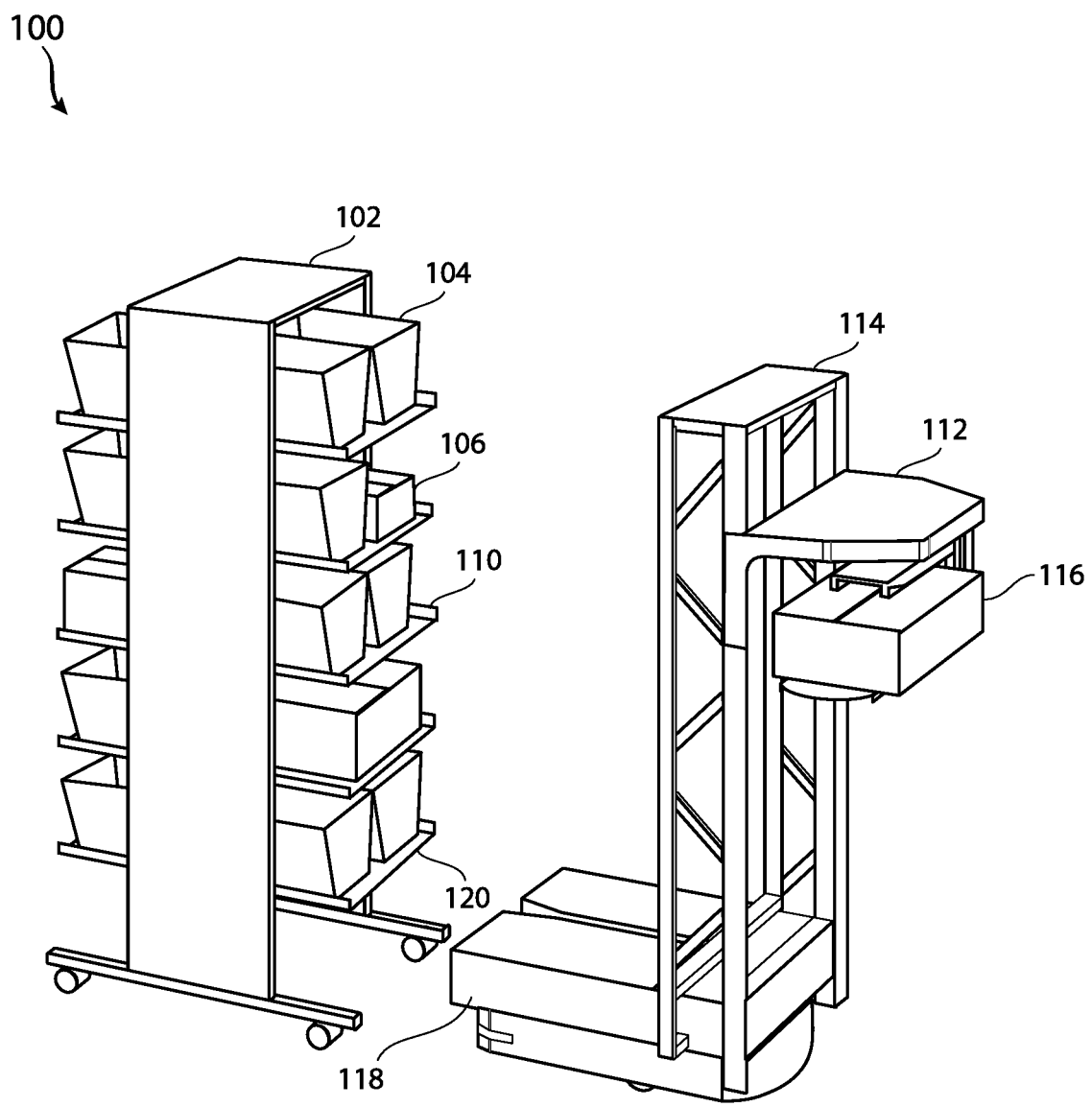
FIG. 1 shows an illustrative example of a tote retrieval system wherein a base of a robotic component including a latch fastening system is utilized to removably engage a latching feature of a detachable cart in accordance with at least one embodiment.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The concepts disclosed herein can apply to any supply chain management and include any context or environment in which carts used to relocate items are moved from one location to another to allow for the relocation of said items in an efficient manner. The present disclosure can address the issues raised above with respect to the inability to change the configuration of automated robotic systems and with respect to the inefficiencies that can result from misallocation of assignments among automated robotic systems and humans within a warehouse environment. A number of different solutions disclosed herein address these issues and improve the process for managing the allocation of assignments among humans and robotic systems and for the movement of items within a warehouse environment through the application of various new technologies.

One example environment that shall be referenced herein as a warehouse environment and what shall be presented are numerous improvements with respect to how items can be transferred from one location to another either in an automated fashion or a hybrid of automated and manual means. While not every concept includes a manual or a human involved in the process, at least one of the embodiments disclosed herein can address the issue of inefficiencies in the allocation of assignments among humans and robotic systems based on their performance within an environment, such that, within hybrid environments that include robotic components and humans, assignments can be adjusted to incorporate humans and robotic components in a manner that enables increased efficiency at times of higher throughput needs.

The term warehouse as used herein is generally meant to include any building or facility used to store items which may need to be transferred from a source location, such as the building or facility or a source container within the building or facility, to a destination location, such as a destination building or facility or a destination container within one or more buildings or facilities (e.g., the source building or facility). Of course, the environment does not formally have to be a warehouse, but this term is merely used to describe generally the building or facility and the environment in which the robots and/or human workers operate.

For clarity of explanation, in some instances the present technology may be presented as including individual functional blocks including functional blocks comprising devices, device components, steps or routines in a method embodied in software, or combinations of hardware and software.

The systems and methods disclosed herein address the problem of managing the movement of items through a warehouse or in another supply chain environment. A number of different examples, configurations and methods will be disclosed. It is noted that in supply chain management environments, any of the concepts disclosed herein, or any of the steps that are taken, can be combined with any other example, step, or concept. For example, the latch fastening system concept can be combined with the robotic cart that can detect the presence of robotic devices that implement the latch fastening system.

OVERVIEW

This disclosure provides various different solutions (e.g., examples, configurations, implementations, procedures, etc.) that address the issues outlined above in different aspects. A first aspect of this disclosure relates to a robotic device, such as an item delivery robot, that includes a latch fastening system that allows the robotic device to removably engage a cart in order to move the cart, and any items positioned on the cart, from one location to another within a warehouse environment. For example, each cart within the warehouse environment can include a latching feature through which a latch can be introduced. A robotic device that includes a latch fastening system can be directed to move to the location of the cart and to position itself such that the latch fastening system is aligned with the latching feature of the cart. The robotic device, via the latch fastening system, can expose a latch that is used to removably engage the latching feature of the cart. This results in a removable connection being established between the robotic device and the cart. Further, this allows the robotic device to move the cart within the warehouse environment to another location as directed by a controller. At this other location, the robotic device can disengage the latch, thereby detaching itself from the cart. This makes the robotic device available to engage other carts within the warehouse and perform additional operations.

In another aspect, a method includes receiving, at a robot being in communication with a control center communication module of a control center, an instruction to relocate a cart to a location where a set of items are stored. The method further includes moving, by the robot, to a second location where the cart is positioned; (2) activating, by the robot, a motor of a latch fastening system to cause movement of a latch arm resulting in a latch being exposed; (3) removably engaging, by the robot and using the latch, the cart via a latching feature of the cart; (4) moving, by the robot, the cart from the second location to the location where the set of items are stored; and (5) transitioning, by the robot, a subset of the set of items to the cart in accordance with the instruction.

In yet another aspect, a system can include a control center comprising a processor and a control center communication module and a robot being in communication with the control center communication module. The robot operates, as instructed by the control center communication module, to transfer carts within a warehouse. The robot includes a latch fastening system configured to removably engage a cart via a latching feature of the cart. This latch fastening system includes a motor, an element mechanically engaged with the motor, and a latch arm that includes, at a first end, a movement assembly mechanically engaged with the element and, at a second end, a latch. The robot further includes a control system in communication with the latch fastening system. This control system (1) operates the robot to move the robot to a first location where the cart is positioned; (2) activates the motor of the latch fastening system to cause movement of the element and the latch arm to cause removable engagement of the latch with the cart via the latching feature of the cart; and (3) operates the robot to move the cart from the first location to a second location where a set of items are stored to obtain a subset of the set of items to the cart.

In another aspect, a cart can include one or more shelves configured to receive a set of containers and a base component. The cart can further include a latching feature that is positioned on the base component. This latching feature is configured to allow removable engagement of a latch, extended from a latch fastening system of a robot, to the latching feature.

DETAILED DESCRIPTION

The disclosure now turns to FIG. 1, which shows an illustrative example of a tote retrieval system 100 wherein a base 118 of a robotic component 114 including a latch fastening system is utilized to removably engage a latching feature of a detachable cart 102 in accordance with at least one embodiment. The tote retrieval system (TRS) 100 can include a robotic device 114 and a detachable cart 102. In an embodiment, the TRS 100 is configured to retrieve or deliver containers of various sizes and shapes 104, 106. The containers are typically on shelves in a warehouse. The TRS 100 can utilize an elevating mechanism 112 which can either retrieve or deliver a container to or from a shelf configured within or on the TRS 100. For instance, as illustrated in FIG. 1, the detachable cart 102 of the TRS 100 can include one or more shelves 110, 120 on which containers and other items, such as containers 104, 106, may be positioned from the shelves of the warehouse and delivered to other locations within the warehouse. The elevating mechanism 112 may also be configured to transfer items from the one or more shelves 110, 120 of the detachable cart 102 of the TRS 100 to the shelves of the warehouse or to other locations as needed.

The TRS 100 can be used in a goods-to-person (GTP) storage system. The general functionality of the TRS 100 relates to moving packages (totes, bins, or cases) from an input conveyance system to a storage and from a storage to an output conveyance system based on orders received from a central planner. The TRS 100 can use various technologies or components including control systems which can be in communication with a central control system to move a component up and/or down to match a shelf level, components to attach to containers for retrieving or placing a respective container, and components to be able to move containers from a shelf in a warehouse to a shelf 110, 120 on the TRS 100. An example structure is shown in FIG. 1 and other configurations are contemplated as well.

Besides picking or placing items from regular conveyors and static shelves, the TRS 100 can also be used to pick or place items from pallets, other TRS units, and mobile single package movers. In addition, the TRS 100 can also accept packages directly from humans and give packages to humans in the context of a hybrid warehouse environment. Thus, the TRS 100 can be used in the context of a hybrid environment or in other environments. Based on throughput data, in order to improve the efficiency, the TRS 100 can be designed to carry multiple packages simultaneously. These packages can be stored on the TRS 100 on a built-in or fixed internal storage or on a detachable cart 102.

As illustrated in FIG. 1, a base portion 118 of the robotic component 114 can be configured to include mechanical components and control components for moving the robotic component 114 around a warehouse and also for controlling the mechanism 112 for delivering and retrieving packages 116.

The base component 118 can be configured to be complementary to a bottom shelf 120 configured on the detachable cart 102 such that the detachable cart can be moved into an attached position. In an embodiment, the base component 118 includes a latch fastening system configured to removably engage a latching feature positioned on the bottom shelf configured on the detachable cart 102 to move the detachable cart 102 into an attached position. The latch fastening system may be disposed on an upper surface of the base component 118 such that a latch of the latch fastening system, when exposed, is usable to removably engage the latching feature positioned on the bottom shelf 120 of the detachable cart 102.

In an embodiment, the robotic component 114 includes one or more sensors configured to detect alignment of the latch of the latch fastening system to the latching feature of the detachable cart 102. The one or more sensors may be disposed in any suitable location on the robotic component 114. The one or more sensors may include a two-dimensional lidar with the scanning plane aligned based on the configuration of the detachable cart 102. A lidar is a light imaging detection and ranging component and uses laser light pulses to scan the environment. The various components of a lidar are within the scope of this discloser such as a control system, storage unit for storing data, sensors for receiving reflected light from the target surfaces, and so forth.

As the robotic component 114 moves towards the detachable cart 102, scans from the two-dimensional lidar are assembled to produce a three-dimensional reconstruction of the detachable cart 102. Note that even though the lidar scan covers an approximately 270° angle, only the shelf that is aligned in height with the lidar is scanned fully (e.g., the bottom shelf 120) and the other shelves above the shelf of interest are included in various degrees. In some instances, the lidar can be mounted on the mechanism 112 so that the lidar can be raised or lowered to line up with the bottom shelf 120 of the detachable cart 102.

In an embodiment, if the robotic component 114 detects that the latch fastening system on the base component 118 is in alignment with the latching feature of the detachable cart 102, the robotic component 114 activates a motor of the latch fastening system to cause the latch of the latch fastening system to be exposed and extend towards the latching feature of the detachable cart 102. The latch may include a gate mounted on a pin or other movable component that, upon making contact with the latching feature, is opened to produce a gate opening. As the latch is moved into position, the latch may accept the latching feature and the gate may be closed, resulting in removable engagement of the latching feature. In some instances, the latch may include one or more sensors that may cause the gate to be closed upon detection of the latching feature being present within the gate opening.

The detachable cart 102 is not shown in the figures as being robotic. However, it is contemplated as within the scope of this disclosure that the removable or detachable cart 102 could also be robotic and be controlled to move independently of the robotic component 114 and potentially deliver various packages 104, 106 which are stored on shelves 110, 120. The packages on the cart 102 can be delivered or moved into a proper position for humans to retrieve or for other robotic components such as another robotic component 114. In an embodiment, the detachable cart 102 can include one or more sensors and a control system coupled to the one or more sensors to obtain sensor data. The sensor data may be used by the control system to detect presence of the robotic component 114 and/or alignment of the latching feature with the latch fastening system of the robotic component 114. In an embodiment, in response to detecting the presence of the robotic component 114, the detachable cart 102 exposes the latching feature to enable introduction of the latch of the latch fastening system. For instance, the latching feature of the detachable cart 102 may be concealed using a retractable cover or other component that is in communication with a control system of the detachable cart 102. Thus, in response to detecting presence of the robotic component 114 and/or alignment with the latch fastening system, the control system may cause the retractable cover or other component to retract to expose the latching feature.

An aspect of this disclosure includes a control mechanism in which the robotic component 114 might store packages 104, 106 on a certain shelf 110 of the detachable cart 102 based on the mode of operation of the robotic component 114 (e.g., hybrid environment with humans operating within the warehouse, a fully-automated environment, etc.). For example, if a warehouse is operating in a hybrid environment in which package 106 is to be retrieved by a human given the throughput needs or other parameters, the robotic component 114 might place the package 106 on a certain shelf at a higher level than might otherwise be placed in order to support the ergonomic requirements of the human. In a transition from a fully robotic environment to a hybrid environment, the TRS 100 may re-arrange the packages on the detachable cart 102 to prepare for human retrieval where the original placement was for an expected robotic interaction. The placement of the package 106 may also be specifically tailored to the height of the actual individual who is expected to retrieve the package. A central planner can utilize location information associated with particular human workers and coordinate a package placement on the detachable cart 102 with the specific individual who will retrieve the package or place a package on the detachable cart 102. In another aspect, the detachable cart 102 may include indicators such as light-emitting diode (LED) lights, sound or other indicators on certain shelves 110, 120 which can instruct a human user to place a package on a particular shelf in a hybrid context.

The advantages of using a detachable cart 102 can include the following. Using the cart allows operational flexibility. The TRS 100 is able to pick up a filled cart instead of spending time at the input port to fill up the cart. Such an approach saves the input port from becoming a bottleneck where several TRS units might be queued up needing to be filled. Similarly, a TRS 100 can drop off a filled cart at an output port. And other advantages that if the human needs to relieve a TRS 100 midway through its operation or vice versa, the cart can simply be detached and used by the human to continue operation. In other words, the easily-detachable configuration of the cart 102 can facilitate a hybrid warehouse environment. In another aspect, different cart types can be used depending on the best fit for a particular warehouse. For example, carts with varying sizes of shelves, heights of shelves, depth of shelves, widths of shelves and so forth can be configured depending on needs. Further, via the latch fastening system, the robotic component 114 can transport the detachable cart 102 within a warehouse environment securely, thereby mitigating the risk of a detachable cart 102 becoming unstable during transport. Further, the latch fastening system allows for robotic components 114 to more readily transport different carts within the warehouse environment as needed.

Figure 2:
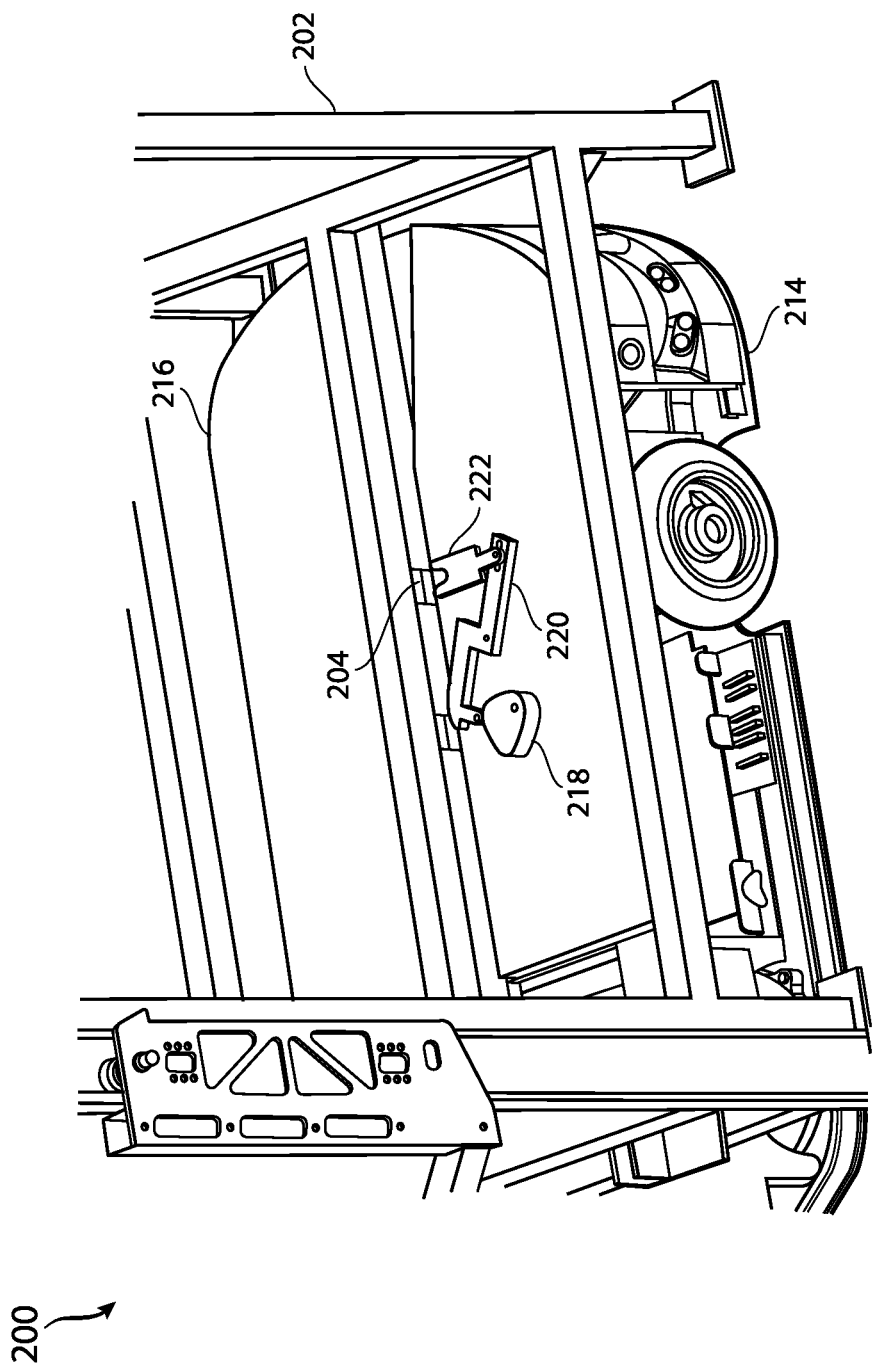
FIG. 2 shows an illustrative example of a tote retrieval system wherein a latch positioned on the base of a robotic component is disengaged from a latching feature of a detachable cart in accordance with at least one embodiment.

FIG. 2 shows an illustrative example of a TRS 200 wherein a latch 222 positioned on the base 216 of a robotic component 214 is disengaged from a latching feature 204 of a detachable cart 202 in accordance with at least one embodiment. As illustrated in FIG. 2, the robotic component 214 is positioned underneath the detachable cart 202 such that the latch fastening system of the robotic component 214 is aligned with the latching feature of the detachable cart 202. This may result in the latch 222 being positioned near the latching feature 204 of the detachable cart 202.

In an embodiment, the latch fastening system of the robotic component 214 includes a set of components that are implemented to move the latch 222 into the latching feature 204 of the detachable cart 202 for removable engagement between the robotic component 214 and the detachable cart 202. As illustrated in FIG. 2, the latch fastening system of the robotic component 214 includes a rotational element 218 disposed on a rotor of an electrical motor that is in communication with a control system of the robotic component 214. Activation of the electrical motor may result in rotation of the rotor and, hence, the rotational element 218. The rotational element 218 may be disposed on an upper surface of the base 216 of the robotic component 214 and may be sized to enable positioning of the latch 222 in accordance with the position of the latching feature 204 of the detachable cart 202. The rotational element 218 may be configured to have a rounded triangle shape, such as a Reuleaux triangle shape. Further, the rotor may be connected to the rotational element 218 at an off-center position such that the position of the rotational element 218 along the plane of the base 216 may change with rotation of the rotor.

The latch fastening system may further include a latch arm 220 that, at a first end, is in mechanical communication with the rotational element 218. For instance, at this first end, the latch arm 220 may include a wheel or other rotational device that is in mechanical communication with the rotational element 218. Thus, based on the rotation of the rotational element 218, the latch arm 220, at this first end, may move towards or away from the component of the detachable cart 202 that includes the latching feature 204.

For instance, as illustrated in FIG. 2, the rotational element 218 is in a position whereby the first end of the latch arm 220 is positioned towards the component of the detachable cart 202 that includes the latching feature 204. While the triangular shape of element 218 is provided by way of example, the rotational element 218 could have other shapes as well which would be used to control the pivot of the arm 220 and the engagement of the latch 222 with the latching feature 204. For instance, the rotational element 218 may have a circular shape, a polygonal shape (e.g., square, pentagon, hexagon, etc.), a gear shape, or any other suitable shape that is conducive to movement of the latch arm 220.

In an embodiment, the latch arm 220, at a second end opposite the first end, includes the latch 222. The latch 222 may be affixed to the latch arm 220 at this second end via any fastening mechanism (e.g., pins, rivets, screws, welds, etc.). As noted above, the rotation of the rotational element 218 may cause the first end of the latch arm 220 to be positioned either towards the component of the detachable cart 202 that includes the latching feature 204 or away from this component of the detachable cart 202. As a result of the latch 222 being affixed to the latch arm 220 at an end opposite this first end of the latch arm 220, if the first end is positioned towards the component of the detachable cart 202, the second end that includes the latch arm 220 may be positioned away from this component of the detachable cart 202. For example, as illustrated in FIG. 2, the latch 222 is positioned away from the latching feature 204 of the detachable cart 202 as a result of the rotational element 218 being positioned in a manner resulting in the first end of the latch arm 220 being positioned towards the component of the detachable cart 202 that includes the latching feature 204.

In an embodiment, the latch fastening system includes one or more sensors that are used to detect alignment of the latch 222 to the latching feature 204 of the detachable cart 202. The one or more sensors may transmit data to a control system of the robotic component 214, which may use this data to determine when the latch 222 is aligned with the latching feature 204. For instance, if the control system receives executable instructions to relocate the detachable cart 202 from one location to another, the control system may collect the sensor data from the one or more sensors to detect when the latch 222 is in alignment with the latching feature 204 of the cart 202. If the latch 222 is in alignment with the latching feature 204, the control system may activate the motor of the latch fastening system to initiate rotation of the rotational element 218. This, in turn, may cause the latch arm 220 and, hence, the latch 222 to move towards the latching feature 204 in order to cause removable engagement between the latch 222 and the latching feature 204.

In some instances, the control system may obtain executable instructions to release a detachable cart 202 once the detachable cart 202 is delivered to a particular location or based on other requirements (e.g., a higher priority task for the robotic component 214 needs to be performed, etc.). If the latch 222 is removable engaged to the latching feature 204 of the detachable cart 202, the control system may disengage the latch 222 from the latching feature 204. For instance, the control system may activate the motor to rotate the rotational element 218, resulting in movement of the latch arm 220 and, hence, the latch 222 away from the latching feature 204. In some instances, if the latch 222 includes a lock or other fastening mechanism that secures the latch on to the latching feature 204, the control system may disengage this lock or other fastening mechanism in order to allow for removal of the latch 222 from the latching feature 204. Alternative, if a human is required to unlock the latch 222 from the latching feature 204, the control system may await confirmation of this unlocking operation prior to activating the motor to position the latch 222 away from the latching feature 204.

Figure 3:
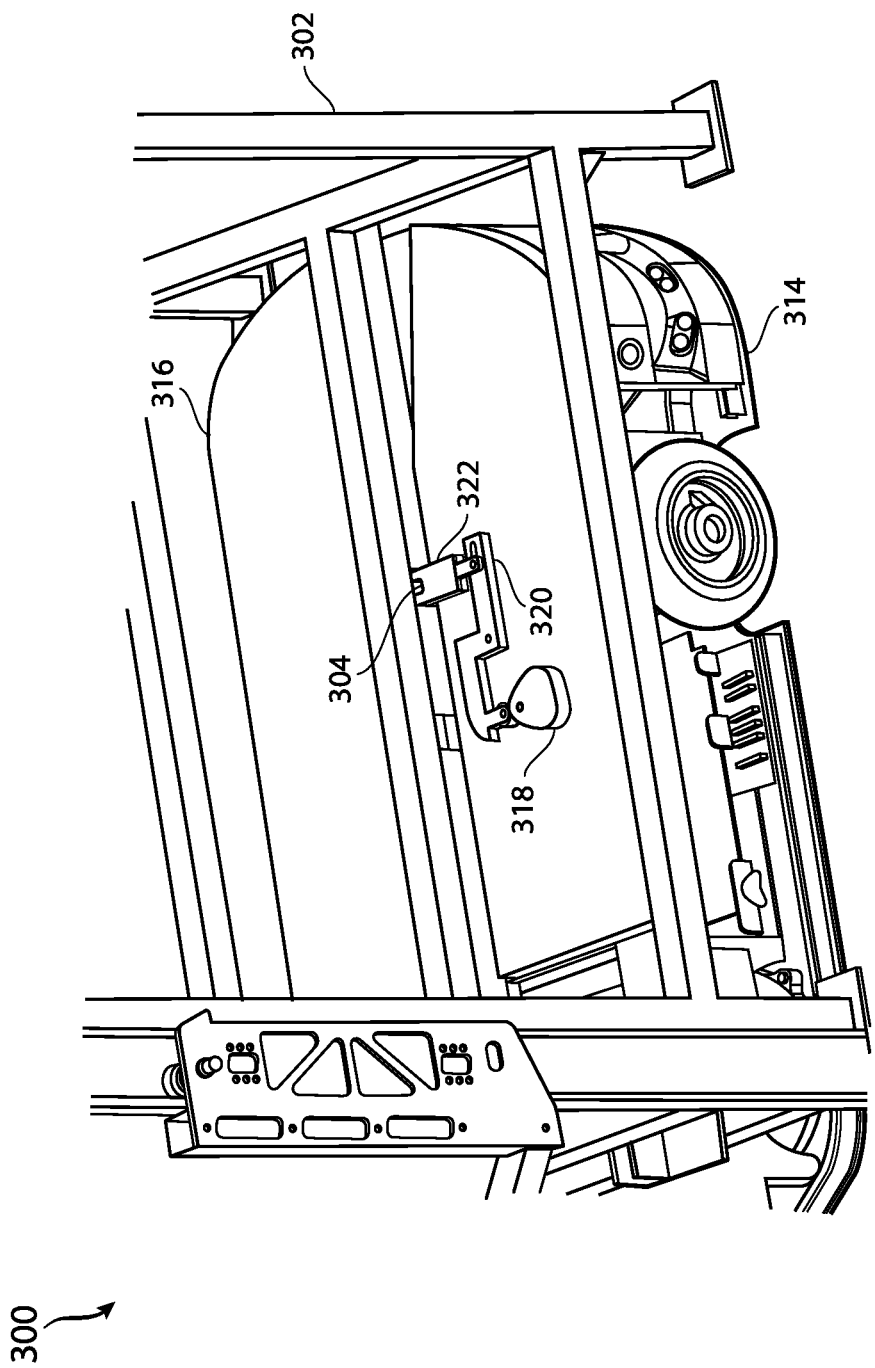
FIG. 3 shows an illustrative example of a tote retrieval system wherein the latch positioned on the base of a robotic component is removably engaged with a latching feature of a detachable cart in accordance with at least one embodiment.

FIG. 3 shows an illustrative example of a TRS 300 wherein the latch 322 positioned on the base 316 of a robotic component 314 is removably engaged with a latching feature 304 of a detachable cart 302 in accordance with at least one embodiment. The TRS 300 may be similar to the TRS 200 described above in connection with FIG. 2. As noted above, the latch fastening system of the robotic component 314 of the TRS 300 includes a motor that may be activate to rotate a rotational element 318. The rotation of this rotational element 318 may result in movement of a latch arm 320 that is in mechanical communication, at a first end, with the rotational element 318. Thus, the rotation of the rotational element 318 may result in movement of the latch arm 320 planar to the base 316 of the robotic component 314.

The latch arm 320 is attached to the base 316 of the robotic component 314 at a center point such that movement of the first end of the latch arm 320 in a first direction results in a second end of the latch arm 320 being moved in a second direction opposite that of the first direction. For instance, as noted above, if the rotation of the rotational element 318 results in movement of the first end of the latch arm 320 towards the horizontal support member of the detachable cart 302 that includes the latching feature 304, the second end of the latch arm 320 opposite the first end may be moved away from this horizontal support member.

As illustrated in FIG. 3, the latch 322 of the latch fastening system is removably engaged with the latching feature 304 of the detachable cart 302. In an embodiment, the latching feature 304 is a lug, clevis, hinge or other component configured to receive a latch 322. The latch 322 may include a clevis pin, bolt, fastener, or other component that may be removably engaged to the latching feature 304. The latch 322 may include one or more components in communication with a control system of the robotic component 314. For instance, if the control system detects that the latch 322 is positioned such that removable engagement with the latching feature 304 may be performed, the control system may activate these one or more components of the latch 322 to engage the latch 322 to the latching feature 304 as illustrated in FIG. 3.

Figure 4:
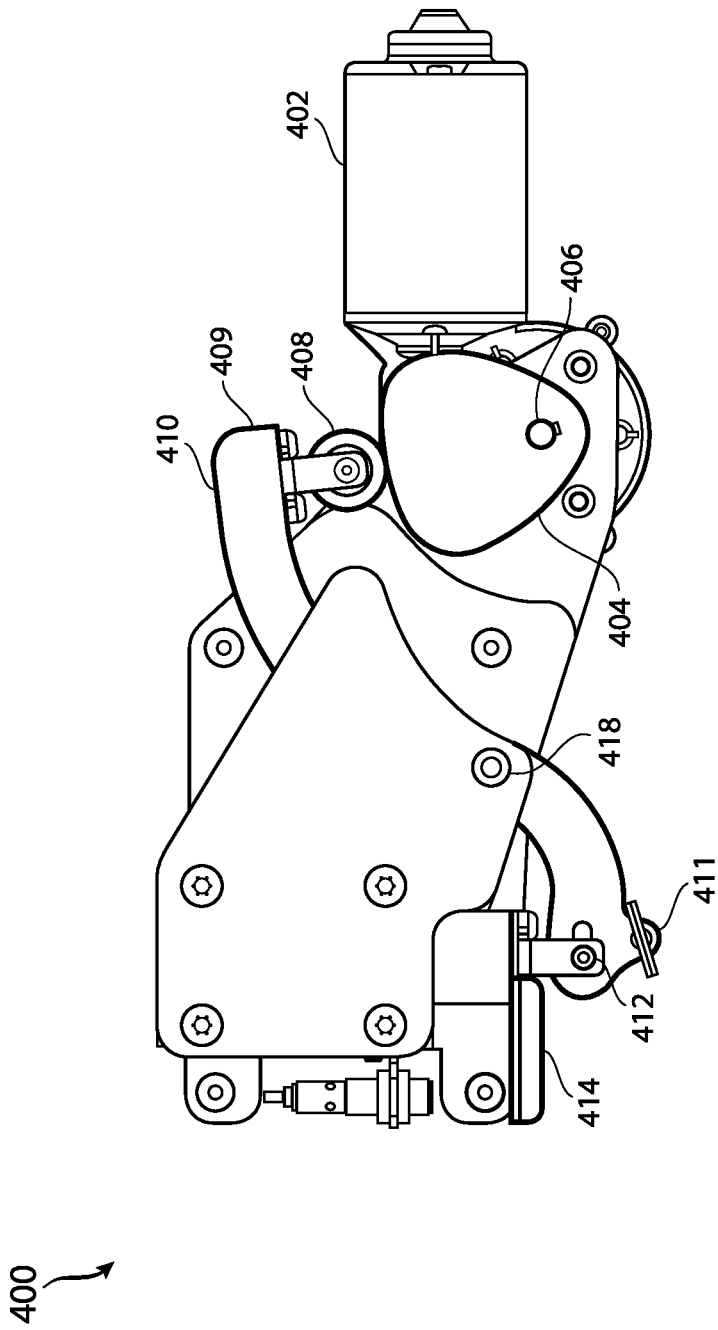
FIG. 4 shows an illustrative example of a latch fastening system of a robotic component in a disengaged configuration in accordance with at least one embodiment.

FIG. 4 shows an illustrative example of a latch fastening system 400 of a robotic component in a disengaged configuration in accordance with at least one embodiment. As noted above and illustrated in FIG. 4, the latch fastening system 400 includes a motor 402 that is in electrical communication with a control system of the robotic component. In an embodiment, the control system activates the motor 402 in response to detecting alignment of the latch fastening system 400 to a latching feature of the detachable cart. Alternatively, the control system may activate the motor 402 in response to receiving instructions from a human controller or control center to either expose or retract a latch to enable removable engagement of the latch fastening system 400 with a latching feature of a detachable cart or to disengage the latch from the latching feature, respectively.

In an embodiment, the motor 402 includes a rotor to which an element 404 of the latch fastening system 400 may be in mechanical communication with a pin 406 or other component. The pin 406 may be installed through the element 404 at a position proximate to a vertex of the element 404 or other distal end of the element 404 relative to the pin 406. This may cause the element 404 to rotate either towards to or away from the end of the latch fastening system 400 from which the latch may be exposed. As illustrated in FIG. 4, the element 404 is positioned such that the end opposite to the distal end of the element 404 where the pin 406 may be positioned is towards the end of the latch fastening system 400 where the latch may be exposed. As described in greater detail below, this may result in the latch being in a retracted position, thereby preventing removable engagement of the latch fastening system 400 to the latching feature of the detachable cart.

In an embodiment, the element 404 is in mechanical communication with a caster 408 or other rotational component that may rotate in accordance with the rotation of the element 404. This caster 408 may be affixed to a first end of a latch arm 410. As the element 404 rotates along the rotational axis of the pin 406 and rotor of the electrical motor 402, the caster 408 may also rotate in order to enable constant mechanical communication with the element 404. Thus, as the element 404 rotates, the caster 408 may allow the latch arm 410 to move along a vertical axis (relative to the components illustrated in FIG. 4). For instance, as the element 404 rotates from the position illustrated in FIG. 4, the caster 408 may maintain mechanical communication with the element 404, thereby causing the latch arm 410 to move downward along this vertical axis.

The latch arm 410, in an embodiment, is installed on to a base plate of the latch fastening system 400 via a pivot pin 418 or other attachment mechanism. This pivot pin 418 may allow the latch arm 410 to rotate along the rotational axis of this pivot pin 418 such that as the latch arm end 409 including the caster 408 moves in one direction along the vertical axis relative to the pin 406 of the element 404, the opposite end 411 of the latch arm 410 moves in a direction opposite to that of the latch arm end 409 including the caster 408. The rotation of the latch arm 410 may be constrained by the element 404, whereby the maximum amount of rotation of the latch arm 410 may be defined based on the distance from the pin 406 to the edge opposite the pin 406.

In an embodiment, the end 411 of the latch arm 410 opposite the end 409 including the caster 408 is removably engaged, via a pin 412 or other attachment mechanism (e.g., clevis pin, latch, etc.) to a latch member 414 that may be extended along a vertical axis (related to the components illustrated in FIG. 4). As noted above, the latch arm 410 may be installed on to a base plate of the latch fastening system 400 via a pivot pin 418 or other attachment mechanism. Thus, as the latch arm 410 is rotated along the rotation axis of this pivot pin 418, the opposite ends 409, 411 of the latch arm 410 may move in opposite directions along the aforementioned vertical axis. As illustrated in FIG. 4, as a result of the end 409 of the latch arm 410 including the caster 408 being in an "upward" position along this vertical axis, the other end 411 of the latch arm 410, wherein the latch arm 410 is connected to the latch member 414 via the pin 412, may be in a "downward" position along this vertical axis.

The latch member 414 may include, at an end opposite the attachment end at which the latch member 414 may be removably engaged with the latch arm 410 via the pin 412, a retractable latch (as described below in connection with, and illustrated in, FIG. 5 as latch 516). As illustrated in FIG. 4, the latch is in a retracted position, whereby the latch is not exposed for removable engagement with a latching feature of the detachable cart. For instance, as a result of the removable engagement with the latch arm 410 via the pin 412, the latch member 414 may also move along the vertical axis in accordance with the movement of the end of the latch arm 410 to which the latch member 414 is removably engaged. Thus, the rotation of the rotational element 404 along the rotational axis of the pin 406 may result in the vertical movement of the latch member 414 along the vertical axis. The latch member 414, as illustrated in FIG. 4, may be in a "downward" position, whereby the latch is in a retracted position and concealed by the base plates of the latch fastening system 400.

In an embodiment, the latch fastening system 400 is configured on to a robotic component and includes a motor 402 that is in electrical communication with a control system of the robotic component configured to activate the motor 402. The latch fastening system 400 further includes a rotational element 404 mechanically engages with the motor 402 via a rotor. Additionally, the latch fastening system 400 includes a latch arm 410 that includes, at a first end, a movement assembly 408 (e.g., caster) mechanically engaged with the rotational element 404. Further, at a second end, the latch arm 410 is mechanically engaged with a latch member 414. The latch arm 410 is mechanically engaged to a base plate of the latch fastening system 400 via a pivot pin that allows for rotational movement of the latch arm 410 along the rotational axis of the pivot pin. The latch member 414 includes a latch (e.g., latch 516 illustrated in FIG. 5) that is configured to removably engage a latching feature of a detachable cart. The latch member 414 is mechanically engaged, at a first end, to the latch arm 410 and the latch is disposed on to a second end of the latch member 414 opposite the first end.

Figure 5:
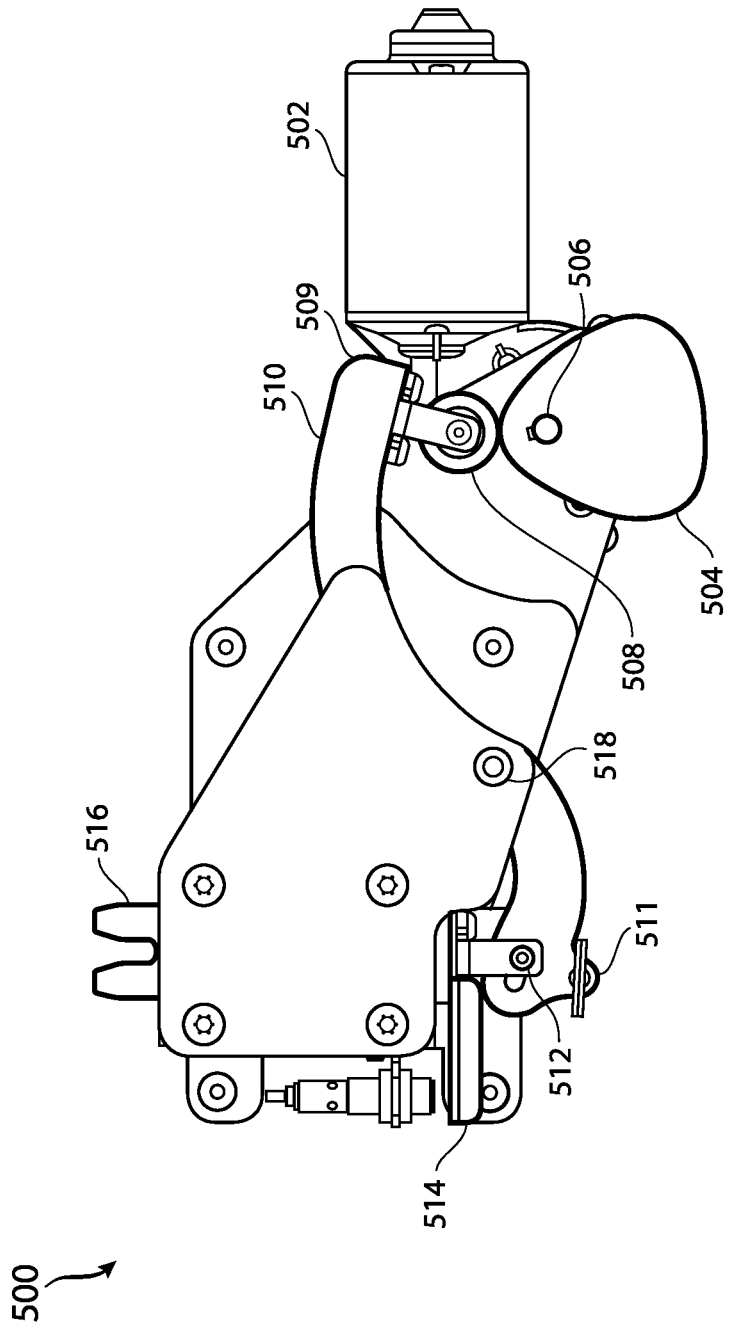
FIG. 5 shows an illustrative example of a latch fastening system of a robotic component wherein a latch is exposed to allow for removable engagement with a latching feature of a detachable cart in accordance with at least one embodiment.

FIG. 5 shows an illustrative example of a latch fastening system 500 of a robotic component wherein a latch 516 is exposed to allow for removable engagement with a latching feature of a detachable cart in accordance with at least one embodiment. The latch fastening system 500 may be similar to the latch fastening system 400 described above in connection with FIG. 4. For instance, the latch fastening system 500 may include a motor 502 and a rotational element 504 in mechanical communication with a rotor of the electrical motor 502 via a pin 506. The element 504 may further be in mechanical communication with a caster 508 attached, at a first end, to a latch arm 510. The opposite end of the latch arm 510 may be in mechanical communication with a latch member 514 via another pin 512. Thus, the rotation of the rotational element 504 may result in the movement of the latch arm 510 and, hence, the latch member 514, as described above.

In an embodiment, a control system of the robotic component activates the motor 502 in response to instructions obtained from a human controller or control center that maintains the warehouse environment. These instructions may correspond to an operation for removably engaging the robotic component to the detachable cart to enable the robotic component to move the detachable cart to another location within the warehouse. The activation of the motor 502 may result in rotation of the rotor of the electrical motor 502, which, in turn, may cause the rotational element 504 to rotate along the rotational axis of the pin 506 to a new position. For instance, as illustrated in FIG. 5, the rotation of the rotational element 504 may result in the end opposite the distal end of the rotational element 504 where the pin 506 may be positioned being in a "downward" position on a vertical axis relative to the components of the latch fastening system 500 as illustrated in FIG. 5. In an embodiment, the latch fastening system 500 includes one or more position sensors configured to obtain data usable to determine the position of the element 504 in relation to the position of the rotor of the electrical motor 502. This may allow the control system of the robotic component to determine the duration of operation of the electrical motor 502 in order to expose or retract the latch 516.

As noted above, the latch fastening system 500 includes a latch arm 510 that is in mechanical communication with the rotational element 504 via a caster 508 or other rotational component affixed to an end 509 of the latch arm 510. The latch arm 510 may be pinned, proximal to a center point of the latch arm 510, to one or more base components of the latch fastening system 510 via a pivot pin 518. This pivot pin 518 may allow for rotational movement of the latch arm 510 along the rotational axis of the pivot pin 518 such that the opposite ends 509, 511 of the latch arm 510 can move in opposite directions along a vertical axis of the latch fastening system 500. For instance, as illustrated in FIG. 5, if the rotational element 504 is positioned such that the end opposite the distal end of the rotational element 504 where the pin 506 may be positioned is in a "downward" position, the latch arm 510 may be rotated such that the end 509 including the caster 508 is also positioned in a "downward" position relative to the rotational element 504.

As a result of the "downward" movement of the end 509 of the latch arm 510 including the caster 508, the opposite end 511 of the latch arm 510 may move in an "upward" direction along the vertical axis of the latch fastening system 500. It should be noted that the movement of the latch arm 510 may be constrained by the movement limitations of the rotational element 504 resulting from the constraints imposed by virtue of the removable engagement of the rotational element 504 to the motor 502 via the pin 506. The motor 502 may be static, such that the motor 502 is constrained within the structure of the robotic component.

Similar to the latch fastening system 400 illustrated in FIG. 4, the latch arm 510 of the latch fastening system 500 may be removably engaged to a latch member 514 via a pin 512 at an end 511 opposite to the end 509 of the latch arm 510 including the caster 508. Thus, the latch member 514 may move in the direction of the end 511 of the latch arm 510 to which the latch member 514 may be removably engaged. For instance, as illustrated in FIG. 5, the latch member 514 is positioned in an "upward" direction along the vertical axis of the latch fastening system 500 in accordance with the position of the end 511 of the latch arm 510 to which the latch member 514 is removably engaged via the pin 512.

In an embodiment, the latch member 514 includes the latch 516 at an end opposite to the pin 512 where the latch member 514 is removably engaged to the latch arm 510 at end 511. The latch 516 may be used to removably engage a latching feature of the detachable cart to connect the detachable cart to the robotic component. The latch 516 may include a gate mounted on a pin or other movable component that, upon making contact with the latching feature, is opened to produce a gate opening. As the latch is moved into position, the latch may accept the latching feature and the gate may be closed, resulting in removable engagement of the latching feature. In one embodiment, as illustrated in FIG. 5, the latch 516 is a gate latch configured to receive the latching feature of the detachable cart via a gate of the latch 516. Upon introduction of the latching feature into the latch 516, the latch fastening system 500 may engage a bolt or other locking mechanism of the latch 516 to constrain the latching feature of the detachable cart within the latch 516. In some instances, the locking mechanism of the latch 516 is in electrical communication with a control system of the robotic component such that the locking mechanism may be engaged or disengaged based on the location of the latching feature within the latch 516 and/or the requirements of the robotic component (e.g., release of the detachable cart at a location, engagement of the detachable cart for movement of the detachable cart to a location, etc.).

In an embodiment, the latch 516 is exposed for removable engagement to the latching feature of the detachable cart. For instance, the movement of the latch member 514 in an "upward" direction along the vertical axis of the latch fastening system 500 may cause the latch 516 to be exposed for use in removably engaging the detachable cart via the latching feature of the detachable cart. The latch 516 may be position between different base components of the latch fastening system 500 such that, when not in use (e.g., retracted), the latch 516 may be removed from the outside environment, thus preventing exposure to conditions that may, over time, result in damage to the latch 516 (e.g., dirt, grime, impact damage, etc.).

Figure 6:
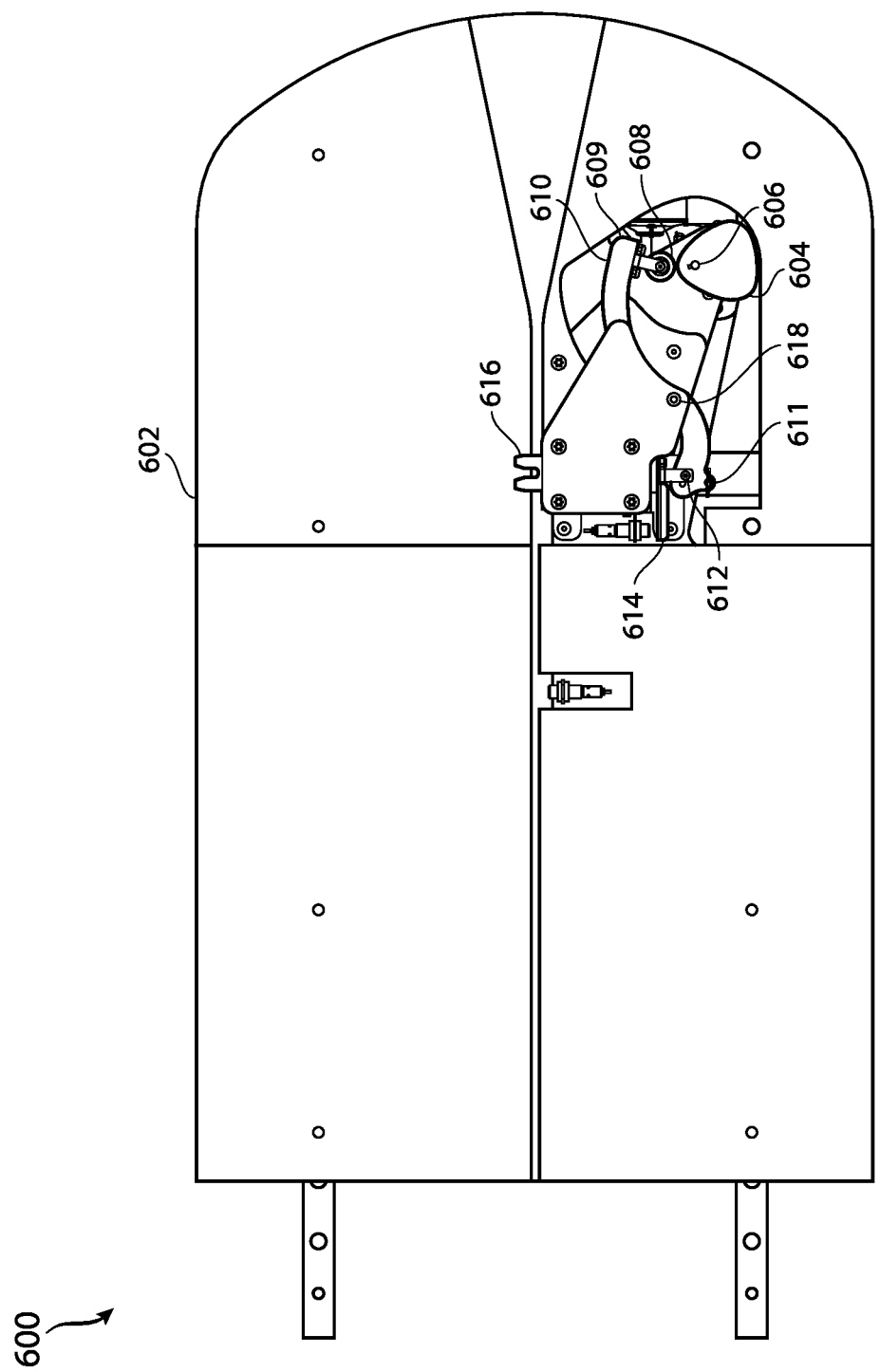
FIG. 6 shows an overhead view of a robotic component that includes a latch fastening system with a latch exposed for removable engagement with a detachable cart.

FIG. 6 shows an overhead view 600 of a robotic component 602 that includes a latch fastening system with a latch 616 exposed for removable engagement with a detachable cart. The latch fastening system illustrated in FIG. 6 may be similar to the latch fastening system illustrated in both FIGS. 4 and 5. For instance, the latch fastening system may include a motor and a rotational element 604 in mechanical communication with a rotor of the electrical motor via a pin 606. The element 604 may further be in mechanical communication with a caster 608 attached, at a first end 609, to a latch arm 610. The opposite end 611 of the latch arm 610 may be in mechanical communication with a latch member 614 via another pin 612. Thus, the rotation of the rotational element 604 may result in the movement of the latch arm 610, along the rotational axis of a pivot pin 618, which, in turn, results in movement of the latch member 614, as described above.

In an embodiment, the latch fastening system is arranged on an upper surface of the base of the robotic component 602 such that the robotic component 602 may be introduced underneath the detachable cart for removable engagement with the latching feature of the detachable cart. This latching feature may be disposed on a lower support beam of the detachable cart, whereby the lower support beam may provide support for a bottom shelf 120 of the detachable cart, as illustrated in FIG. 1. The latch fastening system may be disposed on the upper surface of the base of the robotic component 602 such that the latch 616 is oriented towards a centerline of the base. This may allow for the removable engagement between the latch 616 and the latching feature of the detachable cart to occur along the centerline of the base of robotic component 602. This has the benefit of increasing the stability of the detachable cart when engaged with the robotic component 602 and during movement of the robotic component 602 and the detachable cart to another location of the warehouse environment.

Figure 7:
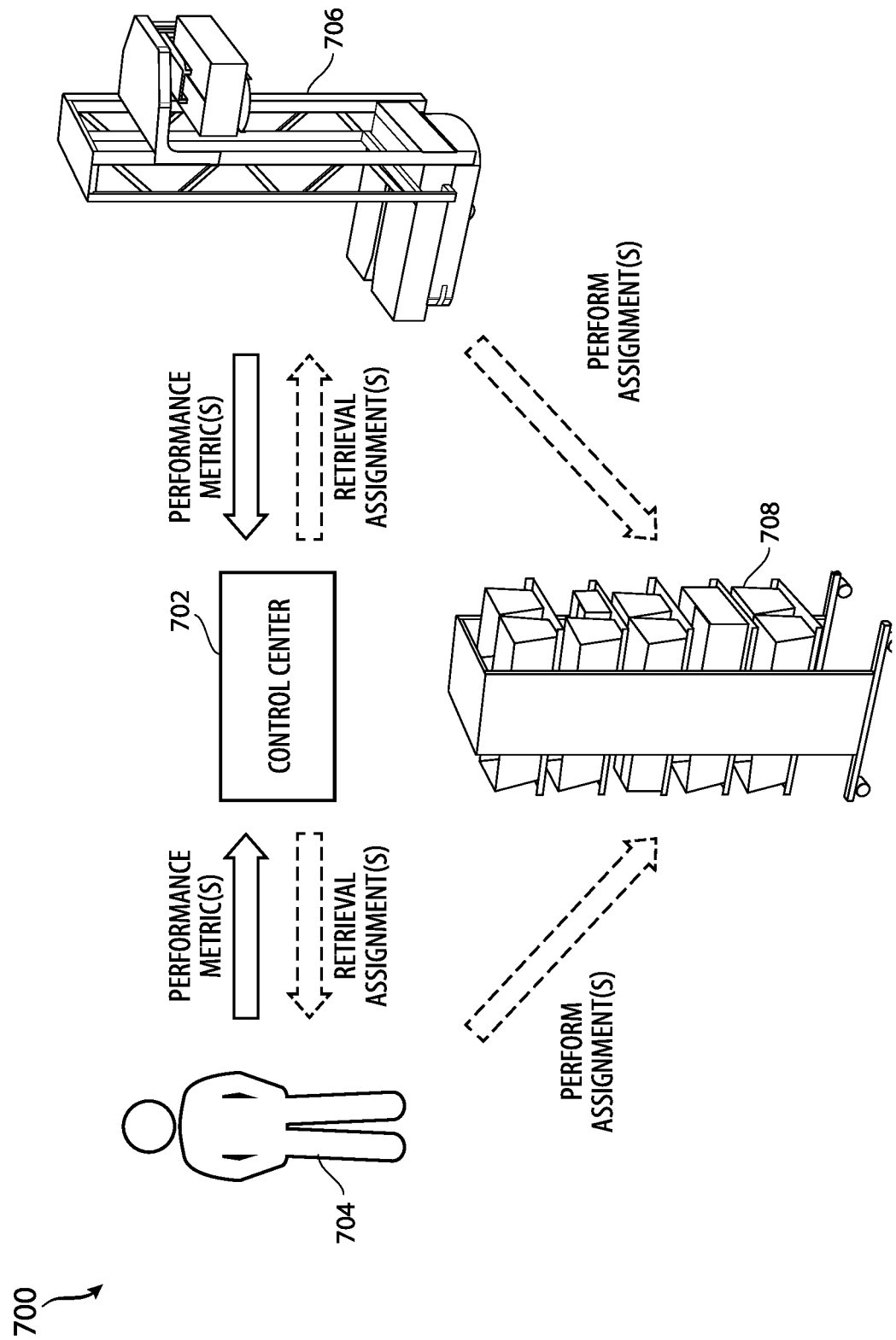
FIG. 7 shows an illustrative example of an environment in which a control center utilizes performance metrics of humans and robotic components within a warehouse environment to determine the allocation of assignments within the warehouse environment in accordance with at least one embodiment.

FIG. 7 shows an illustrative example of an environment 700 in which a control center 702 utilizes performance metrics of humans 704 and robotic components 706 within a warehouse environment to determine the allocation of assignments within the warehouse environment in accordance with at least one embodiment. The control center 702 can coordinate the operations of humans 704 and robotic components 706 within the warehouse environment in order to complete one or more tasks, such as delivering items from a first location, such as a cart 708, to another location within the warehouse environment. In an embodiment, the control center 702 includes a processor and a control center communication module that is configured to transmit instructions to the robotic components 706 and to the humans 704 via a headset, audible instructions, visual instructions, and the like. For instance, a human 704 may wear a set of headset that can be used to provide audible instructions to the human 704. The headset may also include a microphone that can receive voice confirmations, commands, questions, and so forth from the human 704. The headset can include an attached or a separate communication module, which can communicate with the control center 702, such that instructions can be provided in audible signals to be communicated between the headset and the control center 702 for managing operations performable by a human 704.

In an embodiment, the control center 702 obtains performance metrics from each of the humans 704 and the robotic components 706 corresponding to operations performed within the warehouse environment. For instance, a performance metric may include the amount of time elapsed between receipt of an assignment and acknowledgement of assignment completion. As another example, a performance metric can include an accuracy rating or compliance rating corresponding to how well the assignment was performed. For example, if an item from a cart 708 was delivered to an incorrect location within the warehouse environment, the performance metric may be lower for this particular assignment. Other performance metrics may serve to indicate whether assignments are completed successfully, any hazards or obstacles encountered during performance of the assignments, distance traveled between origin and destination locations in performance of the assignments, and the like.

In an embodiment, the control center 702 aggregates the performance metrics obtained from the various humans 704 and robotic components 706 operating within the warehouse environment in order to determine how best to allocate new assignments. For instance, the control center 702 may aggregate the performance metrics within a database, where the performance metrics may be organized based on the entities that provided the performance metrics. Alternatively, the performance metrics may be organized by the type of assignment performed. The entries may also be ordered based on the order in which the assignments were allocated to any of the humans 704 and/or robotic components 706.

In an embodiment, the control center 702 determines to which entity an assignment is to be allocated based on the aggregated performance metrics obtained from the various humans 704 and robotic components 706 over time, as well as any assignments currently being performed within the warehouse environment and the current location of each of the humans 704 and robotic components 706 within the warehouse environment. For instance, if the control center 702 determines that an item from detachable cart 708 is to be moved from the detachable cart 708 to a particular location within the warehouse environment, the control center 702 may evaluate the aggregated performance metrics to determine which entity is best suited to perform the assignment (e.g., has performed similar assignments in an efficient manner, etc.). Once an entity (e.g., human or robotic component) is identified, the control center 702 may determine where this entity is located and whether the entity is available to perform the assignment within a predetermined time period. Based on the entity's location and availability, the control center 702 may determine whether the assignment may be assigned to this entity. If so, the control center 702 may transmit instructions corresponding to this assignment to the entity.

In an embodiment, if the preferred entity is not available to perform the assignment, the control center 702 can select an alternative entity for performance of the assignment. For instance, the control center 702 may re-evaluate the aggregated performance metrics, as well as the location and availability information for each entity, to select another entity that may perform the assignment. In this manner, the control center 702 may allocate the assignment to an entity that is capable of performing the assignment in an efficient manner within the warehouse environment.

In an embodiment, machine learning or artificial intelligence can be used to train an assignment allocation algorithm. Various data points with respect to the performance metrics described above, as well as location and availability information, can be used, such that models can be trained to determine how efficiently or quickly a human 704 or robotic component 706 can perform various assignments within the warehouse environment based on various assignment models. Thus, the decisions with respect to how to allocate assignments to humans 704 and robotic components 706 within the warehouse environment can be machine learning driven.

Figure 8:
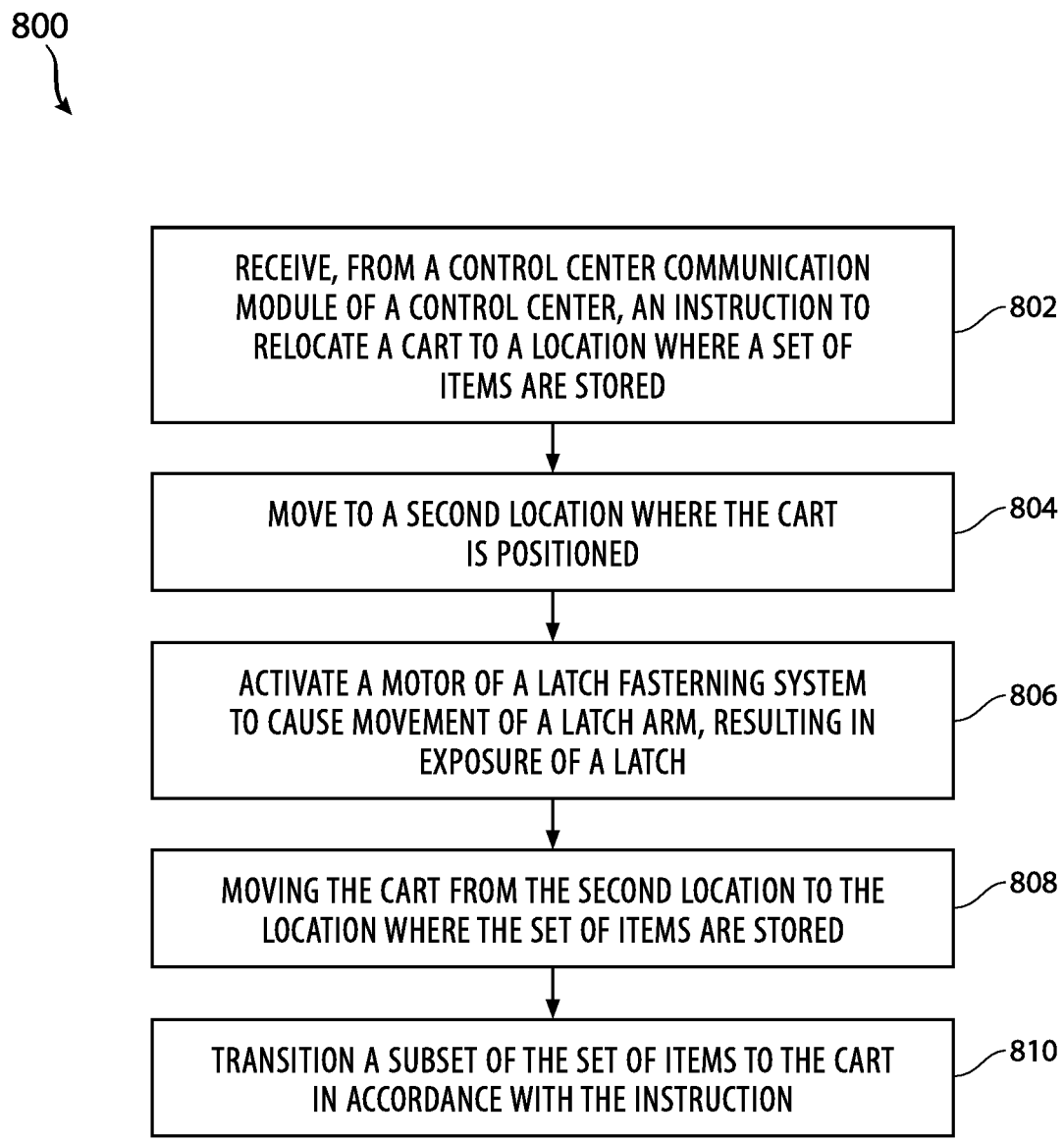
FIG. 8 shows an illustrative example of a process for removably engaging a detachable cart to move the detachable cart to a location where a set of items are stored in accordance with at least one embodiment.

FIG. 8 shows an illustrative example of a process 800 for removably engaging a detachable cart to move the detachable cart to a location where a set of items are stored in accordance with at least one embodiment. The process 800 may be performed by a robotic component that includes a latch fastening system that is configured to removably engage, via a latch, a latching feature of the detachable cart. In an embodiment, the robotic component receives 802, from a control center communication module of a control center, an instruction to relocate a detachable cart to a location where a set of items are stored. The instruction may include coordinates corresponding to a location where the detachable cart may be located as well as the location where the detachable cart is to be moved to in order to transition items to the cart. It should be noted that the instruction to relocate the cart may be for purposes other than for transitioning items to the cart. For instance, the instruction may be to transition a cart holding a set of items to another location where the items may be unloaded from the cart onto a delivery station or to another cart.

In response to the instruction, the robotic component may move 804 to a second location where the detachable cart is positioned. For instance, based on the instruction, the robotic component may determine how best to navigate within the warehouse environment to reach the second location where the detachable cart is located. In an embodiment, the robotic component positions itself below the detachable cart such that a latch fastening system of the robotic component is in alignment with a latching feature of the detachable cart. For instance, the robotic component may obtain sensor data from one or more sensors disposed on the robotic component to detect the one or more features of the detachable cart. Using this sensor data, the robotic component may align and orient itself in order to move into a position underneath the detachable cart. Further, using this sensor data, the robotic component may detect when the latch fastening system is in alignment with the latching feature of the detachable cart.

In an embodiment, at the second location, the robotic component activates 806 a motor of the latch fastening system to cause movement of a latch arm, resulting in exposure of a latch. As noted above in connection with FIGS. 4 and 5, the robotic component may activate the motor to rotate a rotational element. This element may be in mechanical communication with a caster attached to the latch arm at a first end. The rotation of the element may cause the latch arm to be moved such that an opposite end of the latch arm pushes a latch member toward the latching feature, exposing the latch. The latch may continue to be exposed until the latch comes into communication with the latching feature, resulting in a removable engagement between the latch and the latching feature.

The robotic component may move 808 the cart from the second location where the cart was originally located to the location where the set of items are stored. The robotic component may initiate movement of the cart once removable engagement has been established between the latch fastening system, via the latch, and the latching feature of the detachable cart. This may ensure that the detachable cart is secure and not prone to significant oscillation or disturbance as it is being moved to the location where the set of items are stored. Once at the location where the items are stored, the robotic component may transition 810 a subset of the set of items to the cart in accordance with the instruction. For instance, the robotic component may utilize an elevating mechanism which can retrieve a container from a warehouse shelf and transition the container to a shelf of the detachable cart. The robotic component can subsequently deliver the subset of the set of items to other locations within the warehouse. The elevating mechanism, as described above, may also be configured to transfer items from the one or more shelves of the detachable cart to the shelves of the warehouse or to other locations as needed.

Figure 9:
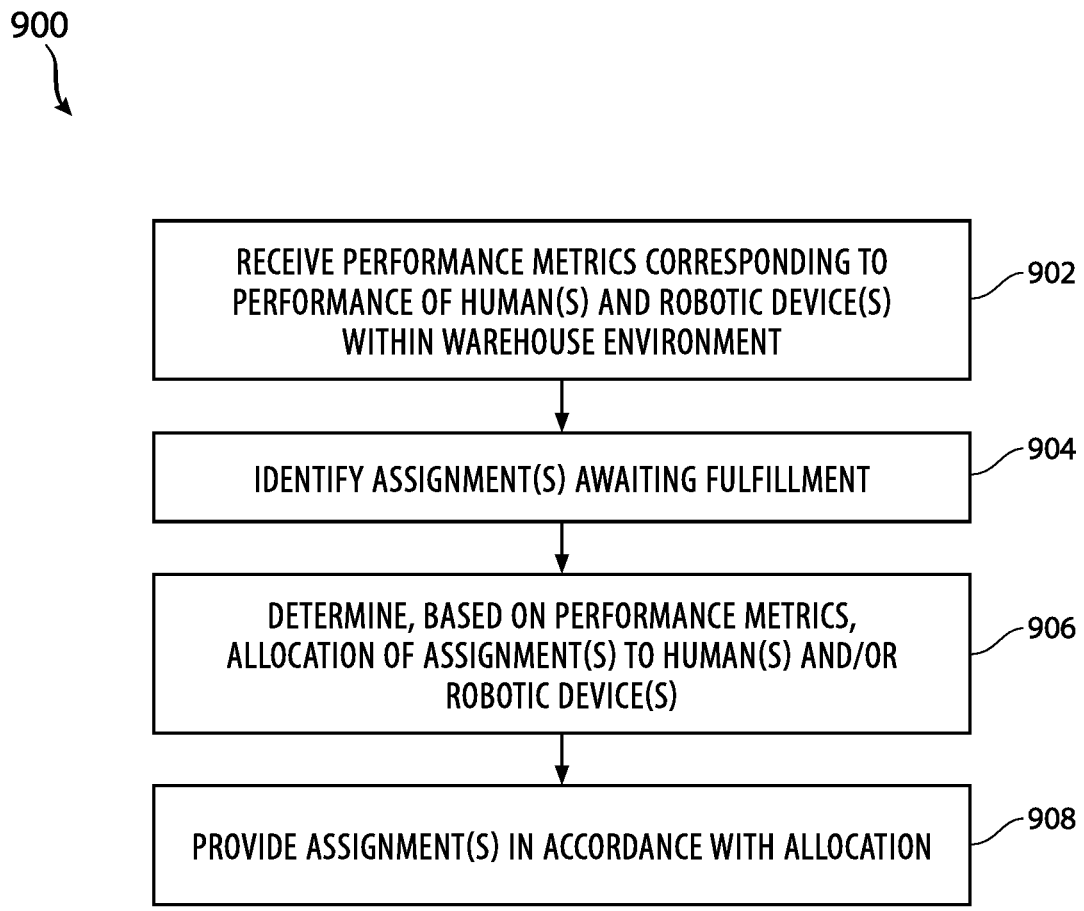
FIG. 9 shows an illustrative example of a process for allocating assignments to humans and robotic components in a warehouse environment based on the performance metrics of the humans and the robotic components in accordance with at least one embodiment.

FIG. 9 shows an illustrative example of a process 900 for allocating assignments to humans and robotic components in a warehouse environment based on the performance metrics of the humans and the robotic components in accordance with at least one embodiment. The process 900 may be performed by a control center of a warehouse environment, which may process incoming performance metrics from the various humans and robotic components operating within the warehouse environment to determine how to allocate different assignments to ensure efficient operation of the warehouse environment. In an embodiment, the control center receives 902 performance metrics corresponding to the performance of humans and robotic devices and other components within the warehouse environment. These performance metrics may include the amount of time elapsed between receipt of an assignment and acknowledgement of assignment completion, an accuracy rating or compliance rating corresponding to how well the assignment was performed, assignment completion data, any hazards or obstacles encountered during performance of the assignments, distance traveled between origin and destination locations in performance of the assignments, and the like.

In response to obtaining the performance metrics from the humans and robotic components operating within the warehouse environment, the control center may identify 904 the assignments awaiting fulfillment and determine 906, based on the obtained performance metrics (as well as any previously obtained performance metrics), allocation of these assignments to humans and/or robotic components operating within the warehouse environment. For instance, based on an analysis of these performance metrics and the parameters of the assignment to be allocated (e.g., location of items to be obtained or delivered, distance between locations, type of task, etc.), the control center may determine whether the assignment would be better performed by a human or robotic component. Based on the determination for each assignment, the control center may provide 908 these assignments to the humans and/or robotic components in accordance with the determined allocation.

Figure 10:
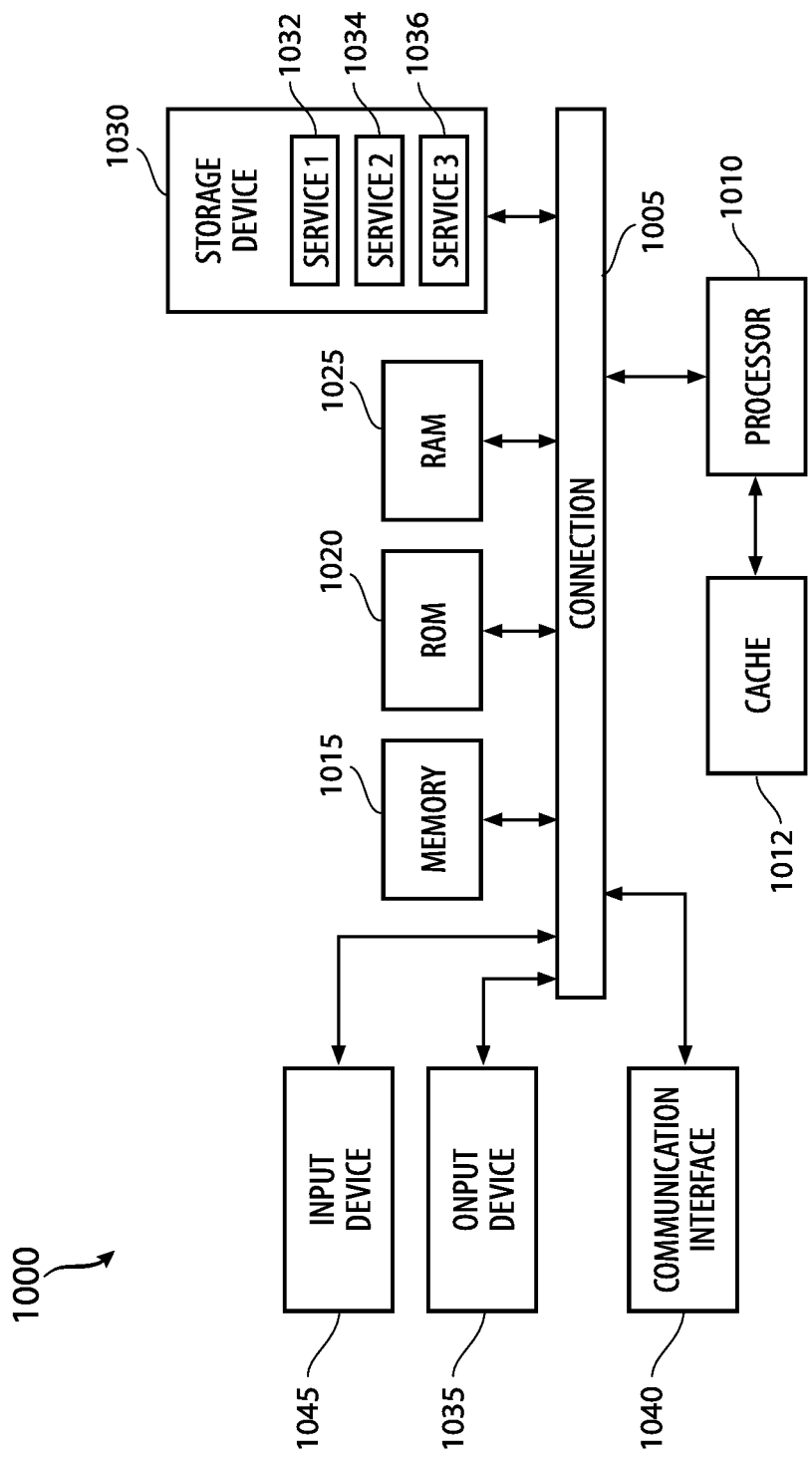
FIG. 10 illustrates example components of a controller managing operations of a warehouse setting in accordance with various embodiments.

FIG. 10 illustrates example components of a controller managing operations of the warehouse setting according to one aspect of the present disclosure. In this example, FIG. 10 illustrates a computing system 1000 (system 1000) including components in electrical communication with each other using a connection 1005, such as a bus. System 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   receiving, at a robot being in communication with a control center communication module of a control center, an instruction to relocate a cart to a location where a set of items are stored;
   moving the robot to a second location where the cart is positioned;
   activating, by the robot, a motor of a latch fastening system to cause horizontal movement of a latch arm, wherein the horizontal movement of the latch arm results in exposure of a fork-shaped latch of the latch fastening system;
   removably engaging, by the robot and using the fork-shaped latch of the latch fastening system, the cart via a latching feature of the cart, wherein the latching feature has a complementary shape to the fork-shaped latch;
   moving, by the robot, the cart from the second location to the location where the set of items are stored; and
   transitioning, by the robot, a subset of the set of items to the cart in accordance with the instruction.

2. The method of claim 1, wherein the motor of the latch fastening system is activated as a result of detection, by the robot, that the robot is positioned underneath the cart.

3. The method of claim 1, wherein the motor of the latch fastening system is activated as a result of a determination, by the robot, that the fork-shaped latch of the latch fastening system is in alignment with the latching feature of the cart to allow removable engagement with the cart.

4. The method of claim 1, further comprising:
   moving, by the robot, the cart from the location where the set of items are stored to a third location where a human is present to retrieve the subset of the set of items from the cart; and
   disengaging, at the third location, the latch fastening system from the latching feature of the cart to release the cart.

5. The method of claim 4, wherein the latch fastening system is disengaged by the robot at the third location.

6. The method of claim 4, wherein the latch fastening system is disengaged by the human present at the third location.

7. The method of claim 1, further comprising:
   determining, based on one or more requirements for movement of the set of items in a warehouse, a first set of operations to be performed by the robot and a second set of operations to be performed by one or more humans; and
   generating, via the control center communication module of a control center, the instruction based on the first set of operations to be performed by the robot.

8. The method of claim 1, wherein the instruction is generated based on an analysis of robot performance in relocating carts within a warehouse and of human performance in relocating the carts within the warehouse.

9. A robot comprising:
   a computer processer; and
   a computer-readable storage device storing instructions which, when executed by the computer processor, cause the computer processor and the robot to perform operations comprising:
   receiving, from a control center communication module of a control center, an instruction to relocate a cart to a location where a set of items are stored;
   moving to a second location where the cart is positioned;
   activating a motor of a latch fastening system to cause horizontal movement of a latch arm, wherein the horizontal movement of the latch arm results in exposure of a fork-shaped latch of the latch fastening system;
   removably engaging, using the fork-shaped latch of the latch fastening system, the cart via a latching feature of the cart, wherein the latching feature has a complementary shape to the fork-shaped latch;
   moving the cart from the second location to the location where the set of items are stored; and
   transitioning a subset of the set of items to the cart in accordance with the instruction.

* * * * *